United States Patent [19]

Tanaka et al.

[11] 4,201,165
[45] May 6, 1980

[54] INTERNAL COMBUSTION ENGINE WITH DUAL INDUCTION SYSTEM AND WITH EGR SYSTEM

[75] Inventors: Toshiaki Tanaka, Fujisawa; Yukihiro Etoh, Yokohama, both of Japan

[73] Assignee: Nissan Motor Company, Limited, Yokohama, Japan

[21] Appl. No.: 958,500

[22] Filed: Nov. 7, 1978

[30] Foreign Application Priority Data

Feb. 24, 1978 [JP] Japan .............. 53/23194[U]

[51] Int. Cl.² .......................................... F02M 25/06
[52] U.S. Cl. .................................................. 123/119 A
[58] Field of Search ..................................... 123/119 A

[56] References Cited
U.S. PATENT DOCUMENTS

| | | | |
|---|---|---|---|
| 3,294,073 | 12/1966 | Bressan | 123/119 A |
| 3,766,896 | 10/1973 | Buehler et al. | 123/119 A |
| 3,786,793 | 1/1974 | Bohls | 123/119 A |
| 3,908,618 | 9/1975 | Tange | 123/119 A |
| 3,978,834 | 9/1976 | Arnaud | 123/119 A |
| 4,020,808 | 5/1977 | Yagi et al. | 123/119 A |
| 4,030,464 | 6/1977 | Yamaguchi et al. | 123/119 A |
| 4,047,509 | 9/1977 | Arnaud | 123/119 A |
| 4,068,637 | 1/1978 | Takamiya | 123/119 A |
| 4,106,471 | 8/1978 | Nakajima et al. | 123/119 A |
| 4,137,879 | 2/1979 | Kageyama et al. | 123/119 A |

*Primary Examiner*—Wendell E. Burns
*Attorney, Agent, or Firm*—Lowe, King, Price & Becker

[57] ABSTRACT

A spark ignition reciprocatory internal combustion engine with dual induction system and with EGR system is provided in which under engine operating conditions when only a primary throttle valve opens, a fluid charge from a primary induction system will swirl around the cylinder axis, while, under engine operating condition when both the primary and secondary throttle valves open, a fluid charge from a secondary induction system will impede and reduce swirling motion of fluid charge from the primary induction system. With the EGR system, the recirculation of exhaust gas is effected through the primary induction system under the engine operating condition with low and intermediate loads. At high loads, the recirculation of exhaust gas is effected not only through the primary induction system but also through the secondary induction system. For this end the EGR system includes a load responsive valve which will permit admission of exhaust gas into the secondary induction system at a position downstream of the secondary throttle valve in response to loads of the engine.

2 Claims, 3 Drawing Figures

DIRECTION OF SWIRLING MOTION

INTERNAL COMBUSTION ENGINE WITH DUAL INDUCTION SYSTEM AND WITH EGR SYSTEM

BACKGROUND OF THE INVENTION

The present invention relates to an internal combustion engine with dual induction system including a primary induction system to direct a first fluid charge into a cylinder to swirl therein under all operating conditions of the engine and a secondary induction system to direct a second fluid charge into the cylinder in such a direction as to impede and reduce the swirling motion of the first fluid charge issuing from the primary induction system under predetermined operating conditions of the engine, thereby maintaining the volumetric efficiency of the engine at sufficiently high level. More particularly, the invention relates to an exhaust gas recirculation (EGR) system for an internal combustion engine as above.

For facilitating evaporation of fuel droplets and increasing flame propagation, it is known to cause an air fuel mixture charge to swirl around the cylinder axis. With this, more stable combustion at low and intermediate loads has resulted. For this purpose various fuel mixture introductions have been employed to produce fuel mixture swirling around the cylinder axis, for example complicated intake port shapes; or shrouded intake valves. If such a complicated induction arrangement is employed, the volumetric efficiency of the engine suffers at high loads and as a result the power output under full or high load conditions drops.

In order to reduce a drop in the volumetric efficiency of the engine, an internal combustion engine with dual induction system is known. In operation of the engine, at low and intermediate loads an air fuel mixture is drawn from a primary induction system only into a cylinder to swirl around the cylinder axis, and at high loads, a secondary induction system becomes operative to direct an air fuel mixture or air into the cylinder in such a direction as to impede and reduce the swirling motion of the mixture issuing from the primary induction system, thereby maintaining the volumetric efficiency of the engine at sufficiently high level.

It is known to operate the engine as above with EGR so as to lower NOx emissions. EGR can be effected through the primary induction system that is provided with an induction arrangement to produce a swirl. With the EGR system, because there is a delay in transmission of a change in induction vacuum due to the provision of the swirl producing arrangement a sluggish response to EGR demand will take place during acceleration and because during acceleration a secondary throttle valve of the secondary induction system will open fully before the primary throttle valve of the primary induction system opens fully, an appropriate strength of vacuum will not take place within the primary induction system to draw into the cylinder a quantity of exhaust gas enough to meet the EGR demand for the acceleration.

If EGR is effected through the secondary induction system, the recirculated exhaust gas will not mix well with air fuel mixture drawn from the primary induction system during engine operating condition with low and intermediate loads because under these conditions the recirculated exhaust gas drawn from the secondary induction system and the air fuel mixture from the primary induction system will not meet or mix with each other until they enter a cylinder. As a result, harsh combustion takes place during operation conditions of the engine with low and intermediate loads.

SUMMARY OF THE INVENTION

It is therefore an object of the present invention to solve the problem as mentioned above by effecting EGR through a secondary induction system during acceleration of the engine so as to improve response characteristics of EGR.

DESCRIPTION OF THE PREFERRED EMBODIMENT

Figure 1:
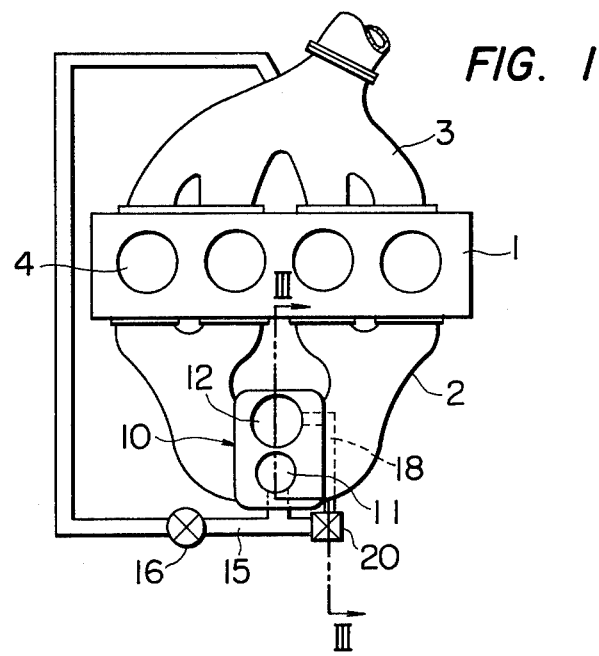
FIG. 1 is a diagrammatic plan view of an internal combustion engine according to the invention.

In FIG. 1, the reference numeral 1 denotes a four cylinder internal combustion engine with dual induction system, the reference numeral 2 denotes an intake manifold and the reference numeral 3 denotes an exhaust manifold.

Figure 2:
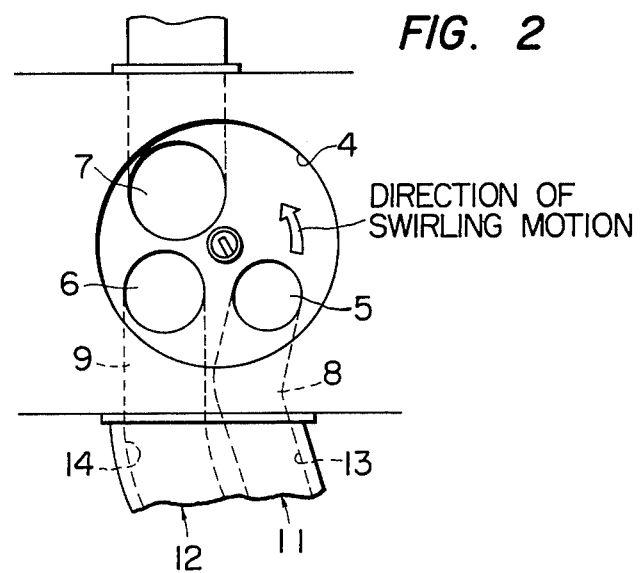
FIG. 2 is an enlarged partial view of the engine shown in FIG. 1.

In FIG. 2, each cylinder 4 is provided with a primary intake valve 5, with a secondary intake valve 6, and with an exhaust valve 7.

The reference numeral 8 denotes a primary intake port passage which is so curved as to direct an air fuel mixture into the cylinder 4 to swirl around the cylinder axis. The reference numeral 9 denotes a secondary intake port passage which directs an air fuel mixture or air into the cylinder 4 in such a direction as to impede and reduce the swirling motion of the mixture from the primary passage 8 during operation of the engine with high loads.

Figure 3:
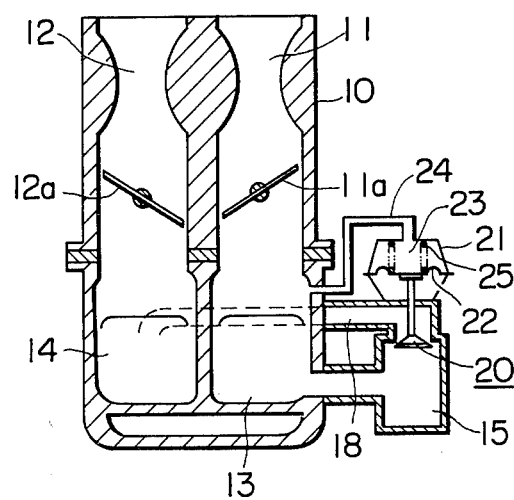
FIG. 3 is a longitudinal sectional view taken through the line III—III shown in FIG. 1.

A two-barrel carburetor 10 comprises, as shown in FIG. 3, a primary induction passage 11 and a secondary induction passage 12, in which when a primary throttle valve 11a operatively connected with an accelerator pedal, not shown, is opened wider than a predetermined opening degree the secondary throttle valve 12a begins to open.

The secondary induction passage 12 is closed by the secondary throttle valve 12a when the engine operates at low and intermediate loads so that an air fuel mixture issues from the secondary intake port passage only when the engine operates at high loads. The primary intake port passage 8, on the other hand, admits an air fuel mixture during all operating conditions of the engine.

For recirculating a portion of exhaust gases, an exhaust gas recirculation (EGR) conduit 15 leads from the exhaust manifold 3 to a primary intake manifold 13. For controlling flow of exhaust gas passing through the EGR conduit 15, an exhaust gas recirculation (EGR) control valve 16 is fluidly disposed in the EGR conduit 15.

Branching from the EGR conduit 15 at a location downstream of the EGR control valve 16 is a branch EGR conduit 18. The branch EGR conduit 18 connects with a secondary intake manifold 14.

A load responsive shut-off valve 20 is disposed in the brach EGR conduit 18 and is operative to open to permit flow of exhaust gas through the branch EGR conduit 18 in response to engine operating condition at high loads, such as the engine operation at acceleration.

The shut-off valve 20 employs a diaphragm device 21 having a diaphragm 22 separating a vacuum chamber 23 from an atmospheric chamber. The vacuum chamber 23 communicates with the primary induction conduit 13 through a vacuum line 24 to receive induction vacuum within the primary induction conduit 13. A return spring 25 is disposed within the vacuum chamber 23 and the shut-off valve 20 is closed when the engine operates under low load.

The EGR control valve 16 is a conventional one which is operative in response to engine operating condition.

When the engine operates at low and intermediate loads, the primary throttle valve 11a of the carburetor 10 opens to permt admission of air fuel mixture through the primary intake port passage 8 so that the mixture swirls within the cylinder 4 around the cylinder axis.

Under these conditions, a vacuum takes place in the vacuum chamber 23 which is strong enough to cause the diaphragm 22 to urge the valve 20 toward a closed positon thereof as illustrated so that the EGR gas flows toward the primary manifold 13.

Because of a swirl within the cylinder 4, the exhaust gases and air fuel mixture from the primary intake port passage 8 will be mixed with each other sufficiently.

Since, at low and intermediate loads, no fluid is drawn into the cylinder 4 from the secondary intake port passage 9, the swirling motion within the cylinder 4 will not be hampered.

When the engine begins to operate under the condition in which NOx emission is likely to increase rapidly, such as when the engine operates at acceleration, the vacuum within the primary intake manifold 13 drops so that the return spring 25 will urge the valve 20 toward an open position.

The exhaust gas, then, will enter into the branch EGR conduit 18 to flow into the secondary intake manifold 14, thus flowing into the cylinder 4 via the secondary intake port passage 9. Since the vacuum prevailing in the secondary intake manifold 14 is strong enough, as compared to that prevailing in the primary intake manifold 13, to draw the exhaust gas into the cylinder 4, an appropriate amount or rate of exhaust gas will be admitted to the cylinder 4 without any appreciable delay, thus effectively reducing NOx emission during acceleration.

At high loads the exhaust gas will be admitted to the cylinder 4 mainly through the secondary intake manifold 14 in response to the opening degree of the EGR valve 16, thus increasing the quantity of fluid charge admitted to the cylinder 4 through the secondary intake port passage 9. This is advantageous in weakening the swirl within the cylinder 4. If the swirl rate were excessively increased under these high load conditions, an amount of heat dissipated toward the cooling fluid would increase excessively, thus requiring more energy to increase the cooling capacity of the engine, and the flame would travel at an excessively high rate. Such problems otherwise would occur have been solved by admitting exhaust gas mainly through the secondary air port passage 9 under the engine operating conditions with high loads.

It will be understood that the appropriate amount of exhaust gas will be admitted to the engine during such engine operating condition as acceleration without any appreciable delay, thus increasing the response characteristics of the EGR system.

It will also be understood that since the exhaust gas will be admitted to the engine mainly through the secondary intake port passage during engine operating codition at high loads, the generation of swirl, which otherwise would occur, will be effectively reduced.

What is claimed is:

1. An internal combustion engine comprising:
   a cylinder block having a cylinder formed therein;
   a piston reciprocably mounted within said cylinder;
   a cylinder head positioned on one end of said cylinder;
   a primary induction system adapted to direct a first fluid charge into said cylinder to swirl therein under all of the operating conditions of the engine;
   a secondary induction system adapted to direct a second fluid charge into said cylinder in such a direction as to impede the swirling of first fluid charge under a predetermined operating condition of the engine;
   an exhaust system adapted to discharge exhaust gas from said cylinder;
   an exhaust gas recirculation conduit leading from said exhaust system to said primary induction system;
   an exhaust gas recirculation control valve adapted to control exhaust gas passing through said exhaust gas recirculation conduit;
   a branch conduit leading from said exhaust gas recirculation conduit at a location downstream of said exhaust gas recirculation control valve to said secondary induction system; and
   a second valve closing said branch conduit, said second valve being operative to open said branch conduit in response to load of the engine.

2. An internal combustion engine as claimed in claim 1, in which said second valve includes a diaphragm device operable in response to induction vacuum within said primary induction system, said second valve opening said branch conduit when the induction vacuum within said primary induction system is below a predetermined level.

* * * * *